(12) United States Patent
Oh

(10) Patent No.: US 12,106,576 B2
(45) Date of Patent: Oct. 1, 2024

(54) DEVICE AND METHOD FOR CONTROLLING VEHICLE

(71) Applicants: HYUNDAI MOTOR COMPANY, Seoul (KR); KIA CORPORATION, Seoul (KR)

(72) Inventor: Tae Dong Oh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 243 days.

(21) Appl. No.: 17/409,268

(22) Filed: Aug. 23, 2021

(65) Prior Publication Data
US 2022/0171977 A1 Jun. 2, 2022

(30) Foreign Application Priority Data
Dec. 1, 2020 (KR) .................. 10-2020-0166072

(51) Int. Cl.
*G06V 20/58* (2022.01)
*B60W 30/16* (2020.01)
*G06T 7/70* (2017.01)
*G06V 10/25* (2022.01)

(52) U.S. Cl.
CPC ............. *G06V 20/58* (2022.01); *B60W 30/16* (2013.01); *G06T 7/70* (2017.01); *G06V 10/25* (2022.01); *B60W 2510/18* (2013.01); *B60W 2520/00* (2013.01); *B60W 2554/404* (2020.02); *B60W 2554/80* (2020.02); *G06T 2207/20084* (2013.01); *G06T 2207/30261* (2013.01)

(58) Field of Classification Search
CPC ...... G06V 20/58; G06V 10/25; G06V 20/588; B60W 30/16; B60W 2510/18; B60W 2520/00; B60W 2554/404; B60W 2554/80; B60W 50/0205; B60W 50/029; B60W 60/0015; B60W 30/08; B60W 40/02; B60W 10/18; B60W 40/10; G06T 7/70; G06T 2207/30261; B60R 21/0134
See application file for complete search history.

(56) References Cited

U.S. PATENT DOCUMENTS

| | | | |
|---|---|---|---|
| 2018/0297590 A1* | 10/2018 | Kang ................ | B60W 30/143 |
| 2021/0046928 A1* | 2/2021 | Ohmura ............. | B60W 50/12 |
| 2022/0093020 A1* | 3/2022 | Kamiya .............. | G02B 27/01 |

FOREIGN PATENT DOCUMENTS

WO  WO-2021212379 A1 * 10/2021 ......... G06K 9/00798

* cited by examiner

*Primary Examiner* — Ig T An
(74) *Attorney, Agent, or Firm* — Morgan, Lewis & Bockius LLP

(57) ABSTRACT

A device for controlling a vehicle may include a sensor that senses an object around the vehicle and acquires travel information of the vehicle, and a controller that creates an integrated line corresponding to a road where the vehicle is traveling, and sets a region of interest corresponding to the object based on the integrated line, and changes the region of interest based on the travel information of the vehicle.

20 Claims, 28 Drawing Sheets

DEVICE AND METHOD FOR CONTROLLING VEHICLE

CROSS-REFERENCE TO RELATED APPLICATION

This application claims the benefit of priority to Korean Patent Application No. 10-2020-0166072, filed on Dec. 1, 2020, the entire contents of which are incorporated herein by reference.

TECHNICAL FIELD

The present disclosure relates to a device and a method for controlling a vehicle.

BACKGROUND

Recently, a technology in which an in-vehicle system controls travel of a vehicle, thereby assisting or replacing driving of a driver, has been developed. To this end, the in-vehicle system must sense objects in front of the vehicle based on a line of a road with respect to regions around the vehicle, and determine a movement of an object around the vehicle.

However, when the objects around vehicle are misrecognized because of an error or a delay (a signal delay) of a sensor, a case in which the movement of the object is misjudged or not determined occurs. As an example, a case in which the object around the vehicle sensed by the sensor is in a cut-in region, and thus, the movement of the object is determined as a cut-in state, but the object does not actually exist in the cut-in region is the misjudged case. The vehicle performs braking control to prevent collision with the surrounding object even when the object is misjudged as being in the cut-in state. When such situation occurs repeatedly, the vehicle decelerates frequently, resulting in lowering ride comfort of the driver.

SUMMARY

An aspect of the present disclosure provides a device and a method for controlling a vehicle capable of accurately determining a behavior of an object around the vehicle even when an error or a delay (a signal delay) of a sensor occurs.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling a vehicle includes a sensor that senses an object around the vehicle and acquires travel information of the vehicle, and a controller that creates an integrated line corresponding to a road where the vehicle is traveling, and sets a region of interest corresponding to the object based on the integrated line, and changes the region of interest based on the travel information of the vehicle.

In one implementation, the region of interest may include at least one of a cut-in region, an inner path region, and/or a deflected region.

In one implementation, the controller may store a critical distance calculated based on the travel information of the vehicle and information on the road as a look up table, and change the region of interest based on the critical distance included in the look up table.

In one implementation, the controller may learn a data set including the travel information of the vehicle and information on the road to output a critical distance, and change the region of interest based on the critical distance.

In one implementation, the controller may generate a calculation formula for calculating a critical distance based on the travel information of the vehicle, travel information of the object, and a distance between the vehicle and the object, and change the region of interest based on the critical distance calculated based on the calculation formula.

In one implementation, the controller may calculate a critical distance based on the travel information of the vehicle, generate a compensation function based on an average speed and an average number of sudden braking of the vehicle, adjust the critical distance based on the compensation function, and change the region of interest based on the adjusted critical distance.

In one implementation, the controller may determine a behavior of the object based on the region of interest.

In one implementation, the controller may apply the region of interest equally to a plurality of different objects and determine behaviors of the plurality of objects when the plurality of different objects sensed by the sensor are determined to be the same object using dead reckoning after the region of interest is set.

In one implementation, the controller may set regions of interest of a case where the object enters the region of interest and a case where the object deviates from the region of interest differently, and determine the behavior of the object based on the region of interest.

In one implementation, the controller may determine the behavior of the object based on the region of interest when the object is sensed in frames of a number higher than a predetermined number of frames even when the sensor does not sense the object in a predetermined frame.

According to another aspect of the present disclosure, a method for controlling a vehicle includes sensing an object around the vehicle and acquiring travel information of the vehicle, creating an integrated line corresponding to a road where the vehicle is traveling, and setting a region of interest corresponding to the object based on the integrated line, and changing the region of interest based on the travel information of the vehicle.

In one implementation, the region of interest may include at least one of a cut-in region, an inner path region, and/or a deflected region.

In one implementation, the method may further include storing a critical distance calculated based on the travel information of the vehicle and information on the road as a look up table, and changing the region of interest based on the critical distance included in the look up table.

In one implementation, the method may further include learning a data set including the travel information of the vehicle and information on the road to output a critical distance, and changing the region of interest based on the critical distance.

In one implementation, the method may further include generating a calculation formula for calculating a critical distance based on the travel information of the vehicle, travel information of the object, and a distance between the vehicle and the object, and changing the region of interest based on the critical distance calculated based on the calculation formula.

In one implementation, the method may further include calculating a critical distance based on the travel information of the vehicle, generating a compensation function based on an average speed and an average number of sudden braking of the vehicle, adjusting the critical distance based on the compensation function, and changing the region of interest based on the adjusted critical distance.

In one implementation, the method may further include determining a behavior of the object based on the region of interest.

In one implementation, the method may further include applying the region of interest equally to a plurality of different objects and determining behaviors of the plurality of objects when the plurality of different objects sensed by the sensor are determined to be the same object using dead reckoning after the region of interest is set.

In one implementation, the method may further include setting regions of interest of a case where the object enters the region of interest and a case where the object deviates from the region of interest differently, and determining the behavior of the object based on the region of interest.

In one implementation, the method may further include determining the behavior of the object based on the region of interest when the object is sensed in frames of a number higher than a predetermined number of frames even when the sensor does not sense the object in a predetermined frame.

DRAWINGS

The above and other objects, features and advantages of the present disclosure will be more apparent from the following detailed description taken in conjunction with the accompanying drawings.

DETAILED DESCRIPTION

Figure 1:
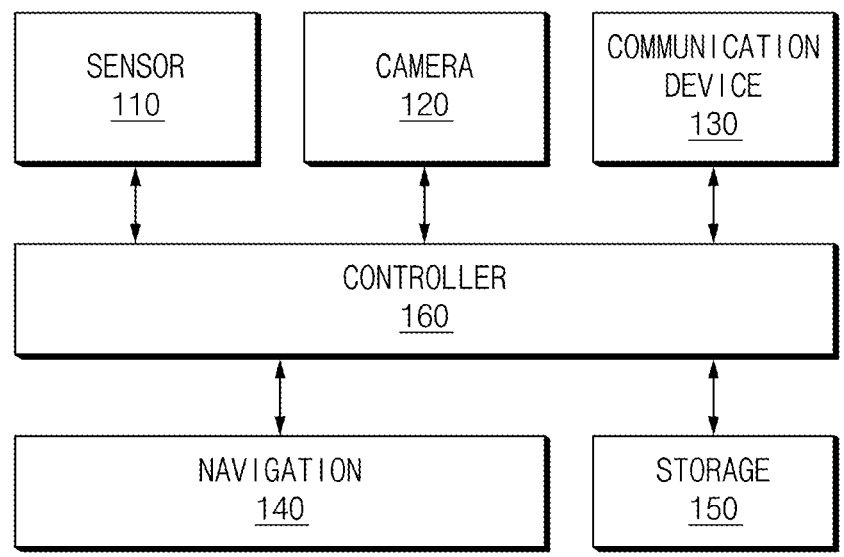
FIG. 1 is a diagram illustrating a configuration of a vehicle control device in one form of the present disclosure.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of the related known configuration or function will be omitted when it is determined that it interferes with the understanding of some forms of the present disclosure.

In describing some forms of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a configuration of a vehicle control device in some forms of the present disclosure.

As shown in FIG. 1, a vehicle control device 100 may include a sensor 110, a camera 120, a communication device 130, a navigation 140, storage 150, and a controller 160.

The sensor 110 may sense an object around a vehicle or a line of a road on which the vehicle is traveling. In this connection, the object may include a vehicle traveling around (in front of) the vehicle. To this end, the sensor 110 may include a lidar, a radar, and the like. In addition, the sensor 110 may acquire travel information of the vehicle. In this connection, the travel information of the vehicle may include information on dynamics of the vehicle, and may include a speed, an acceleration, a travel direction, a heading angle, a travel intention, a yaw rate, a steering wheel angle, and the like of the vehicle. In this case, the sensor 110 may include a speed sensor, an acceleration sensor, a travel direction sensor, a steering wheel sensor, a yaw rate sensor, a heading sensor, and the like.

The camera 120 may sense the object around the vehicle or the line of the road on which the vehicle is traveling. The camera 120 may include a front camera capable of acquiring an image of a region around the vehicle. The camera 120 may include a CMOS or CCD image sensor, and may acquire a still image or a moving image.

The communication device 130 may perform V2X communication. The V2X may include vehicle to vehicle (V2V) communication. In some forms of the present disclosure, the communication device 130 may receive information on the road (a state of the road) by communicating with a server, and receive travel information on the object (information on dynamics of the object: a speed, an acceleration, a travel direction, a heading angle, a travel intention, a yaw rate, a steering wheel angle, and the like of the object) from the object by communicating with the object traveling around the vehicle.

The navigation 140 may include a GPS receiver to receive a current location of the vehicle, and provide map image information of a certain region, road guide image information, road guidance audio information, vehicle speed information, and the like based on the current location of the vehicle.

The storage 150 may store at least one algorithm that performs operation or execution of various commands for an operation of the vehicle control device in some forms of the present disclosure. The storage 150 may include at least one storage medium of a flash memory, a hard disc, a memory card, a read-only memory (ROM), a random access memory (RAM), an electrically erasable programmable read-only memory (EEPROM), a programmable read-only memory (PROM), a magnetic memory, a magnetic disk, and/or an optical disk.

The controller 160 may be implemented by various processing devices such as a microprocessor or the like with an embedded semiconductor chip or the like capable of performing the operation or the execution of the various commands, and may control overall operations of the vehicle control device in some forms of the present disclosure based on the at least one algorithm stored in the storage 150. More specifically, the controller 160 may create an integrated line corresponding to the road on which the vehicle is traveling, set a region of interest corresponding to the object based on the integrated line, and change the region of interest based on the travel information of the vehicle.

First, the controller 160 may detect the integrated line. A more detailed description will be given with reference to FIGS. 2A to 4B.

FIGS. 2A to 4B are diagrams for illustrating an operation of creating an integrated line in some forms of the present disclosure.

The controller 160 may create a lane link based on a center of a lane on which the vehicle is traveling, and may create a virtual line based on the lane link. In this connection, the virtual line may mean a line that is virtually created to determine a behavior (at least one of a cut-in travel state, an inner path travel state, and/or a deflected travel state) of the vehicle. When the object around the vehicle invades the virtual line, the controller 160 may perform deceleration control to prevent collision.

Figure 2A:
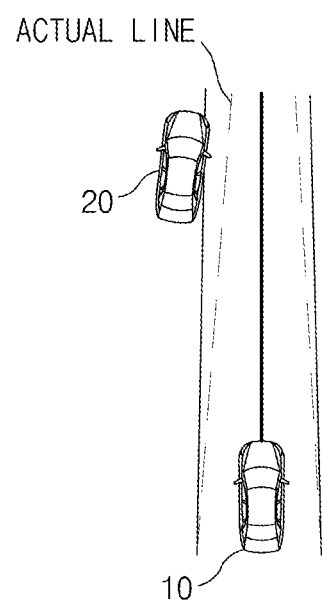
FIGS. 2A to 4C are diagrams for illustrating an operation of creating an integrated line in one form of the present disclosure.
Figure 2B:
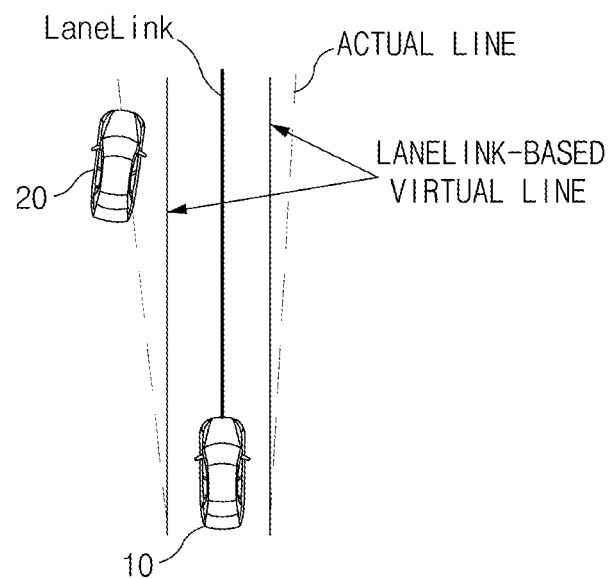

As shown in FIG. 2A, the controller 160 executes the deceleration control when an object 20 around a vehicle 10 invades the virtual line. Because the object 20 around the vehicle 10 did not invade an actual line of the vehicle, a driver may feel uncomfortable deceleration resulted from misdetection. In addition, as shown in FIG. 2B, the controller 160 does not perform the deceleration control because the object 20 around the vehicle 10 did not invade the virtual line even when the object 20 around the vehicle 10 invaded the actual line, and a situation in which the driver is exposed to a risk of collision may occur when the travel speed is maintained. Accordingly, the controller 160 may create the integrated line capable of accurately determining a behavior of the object based on a state of the road. In some forms of the present disclosure, the controller 160 may create the integrated line based on Table 1.

TABLE 1

| | General section | Line varying section | Unusual section |
| --- | --- | --- | --- |
| Expressway | Based on lane link (lane width is almost constant) | Based on lane side (near toll gate) | Based on point level path |
| Downtown | Based on lane side (lane width varies greatly) | Based on lane link (pocket lane, when lane width is great) | Same as above |

Figure 3:
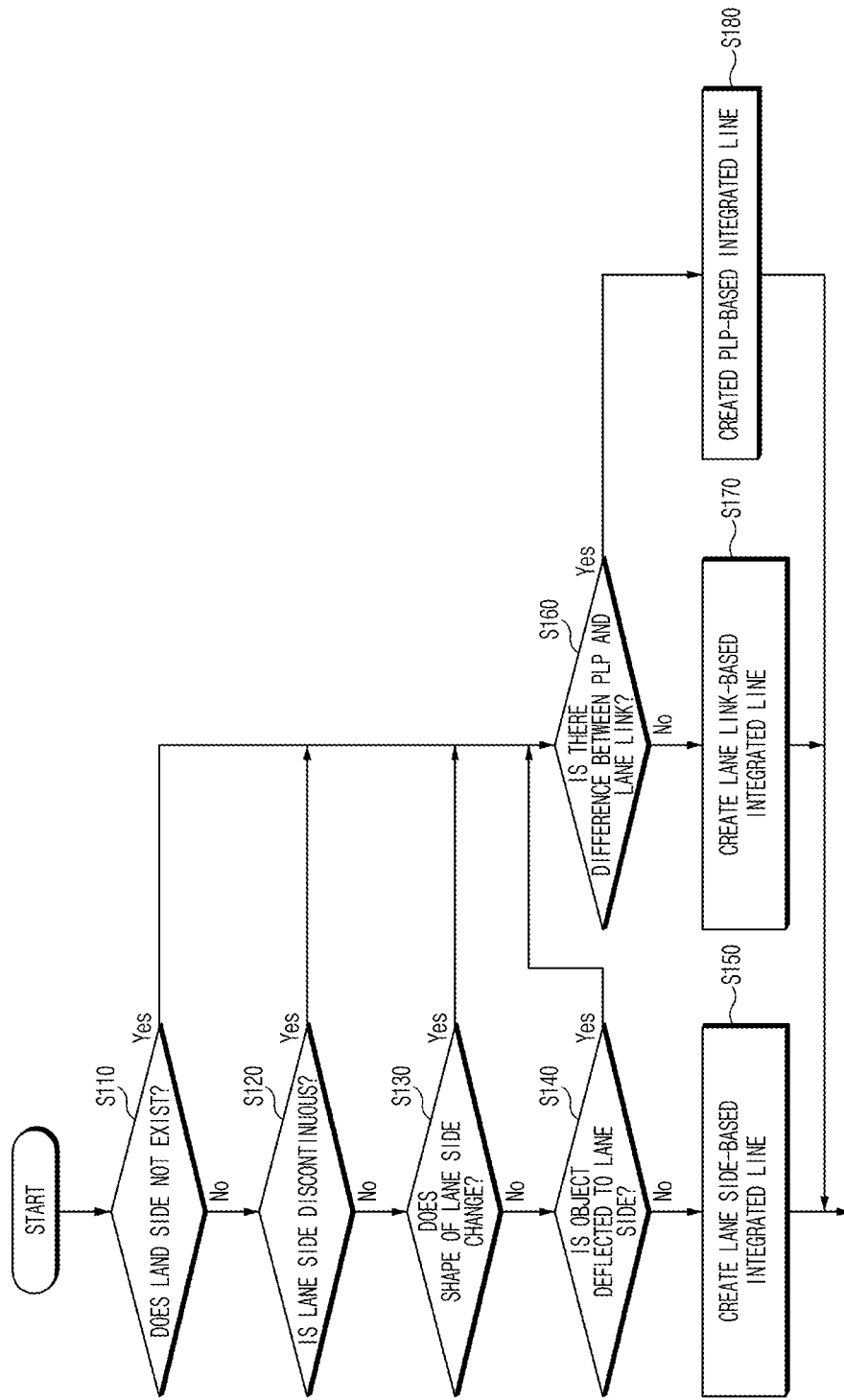

In some forms of the present disclosure, the controller 160 may create the integrated line based on a flowchart of FIG. 3.

As shown in FIG. 3, the controller 160 may determine whether a land side does not exist (S110). In this connection, the land side may mean a portion where the road ends, that is, an outermost portion of the road. When it is determined in S110 that the land side does not exist (N), the controller 160 may determine whether the lane side is discontinuous (S120).

When it is determined in S120 that the lane side is not discontinuous (N), the controller 160 determines whether a shape of the lane side changes (S130). When it is determined in S130 that the shape of the lane side does not change (N), the controller 160 determines whether the object is traveling in a deflected state to the lane side (S140). When it is determined in S140 that the object is not traveling in the deflected state to the lane side (N), the controller 160 may create the integrated line based on the lane side (S150). The controller 160 may create the integrated line based on S150 when the vehicle is traveling on an expressway.

On the other hand, when the lane side does not exist in S110, the lane side is discontinuous in S120, the shape of the lane side changes in S130, or the object travels in the deflected state to the lane side in S140, whether there is a difference between a point level path (PLP) and the lane link may be determined (S160). In this connection, the PLP may include a following route used for vehicle travel control, and the lane link may mean the center of the lane.

When it is determined in S160 that there is no difference between the PLP and the lane link (N), the controller 160 may create the integrated line based on the lane link (S170). On the other hand, when it is determined in S160 that there is the difference between the PLP and the lane link (Y), the controller 160 may determine travel deviating the following route of the vehicle and the center of the lane (e.g., a lane change, a U-turn, a P-turn, a deflected travel), and create the integrated line based on the PLP (S180).

Figure 4A:
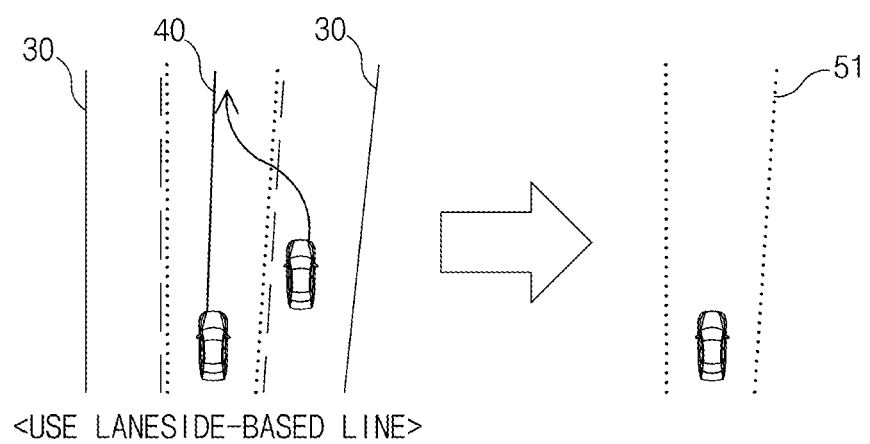
Figure 4B:
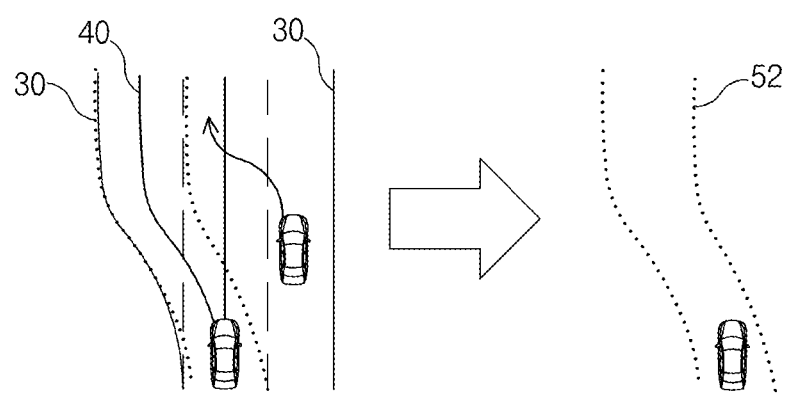
Figure 4C:
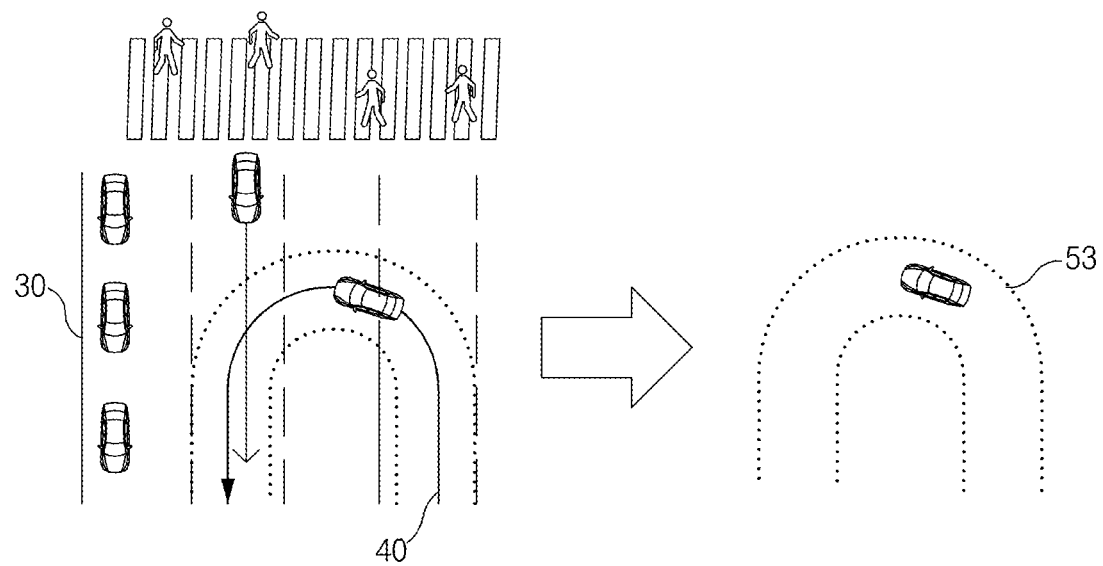

In some forms of the present disclosure, when performing operation S150 of FIG. 3, the controller 160 may create an integrated line 51 based on a lane side 30 as shown in FIG. 4A. In addition, when performing operation S170 of FIG. 3, the controller 160 may create integrated lines 52 and 53 based on a lane link 40 as shown in FIG. 4B and FIG. 4C.

When the integrated line is created, the controller 160 may acquire the information on the object and perform pre-processing. In some forms of the present disclosure, the controller 160 may collect the information on the dynamics (a location, the speed, the acceleration, a type, and the like) of the object. In this connection, the controller 160 may collect not only object information of a current frame, but also object information of previous frames.

When the information of the object is acquired and pre-processed, the controller 160 may set the region of interest corresponding to the object sensed by the sensor. Because the object may be spaced at a long distance or a close distance apart from the vehicle, and may travel at a higher or lower speed than the vehicle, and objects may have different travel tendencies, the controller 160 may set each region of interest for each object. For a more detailed description, FIGS. 5 to 8 will be referred.

Figure 5A:
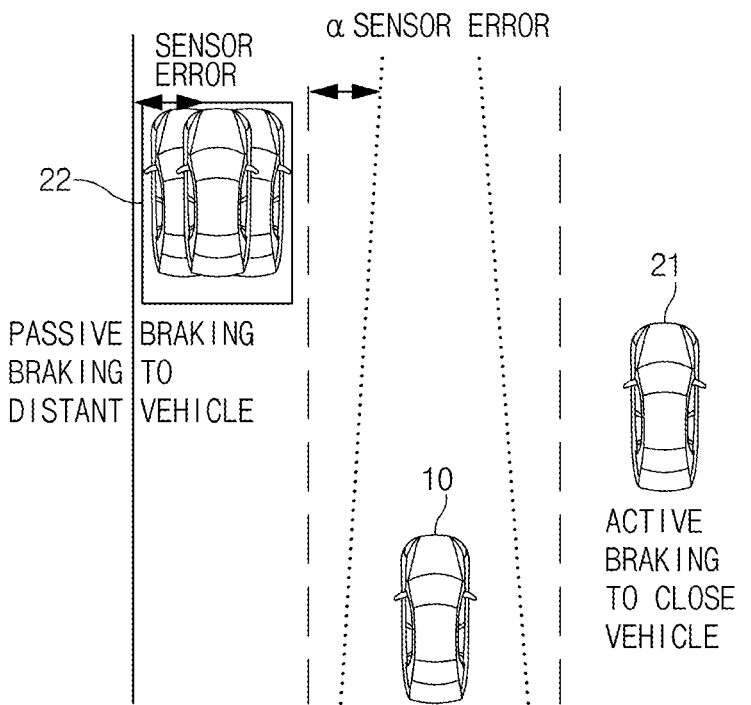
FIGS. 5A and 5B are diagrams schematically illustrating a scheme of setting a region of interest in one form of the present disclosure.
Figure 5B:
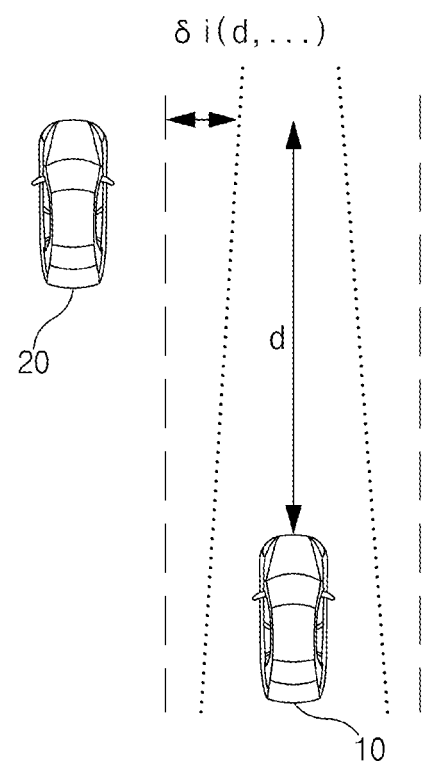
Figure 6:
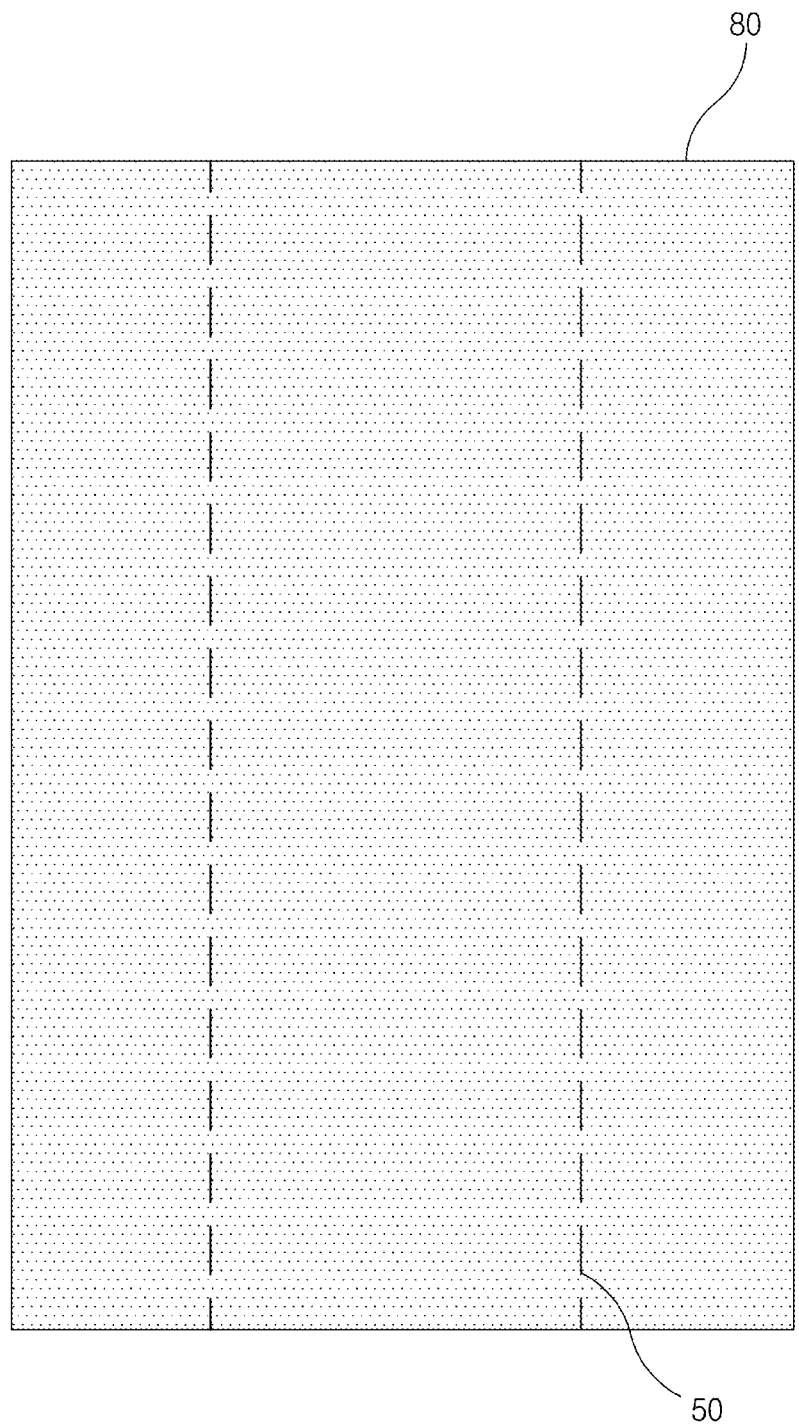
FIGS. 6 to 8 are diagrams illustrating a region of interest set in one form of the present disclosure.
Figure 7:
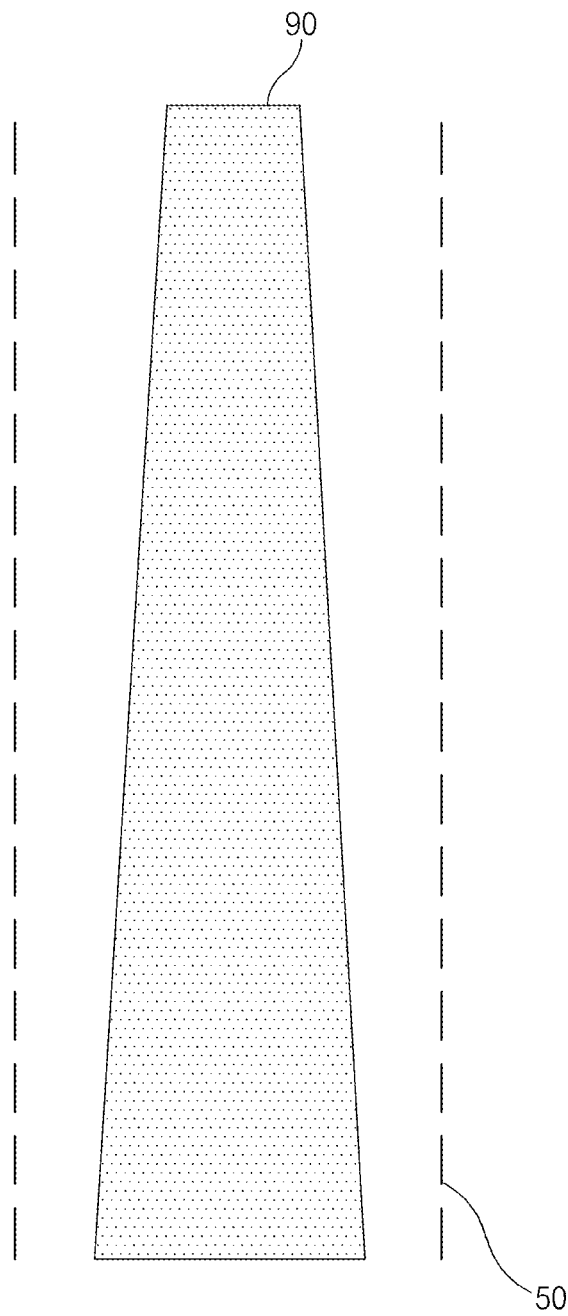
Figure 8:
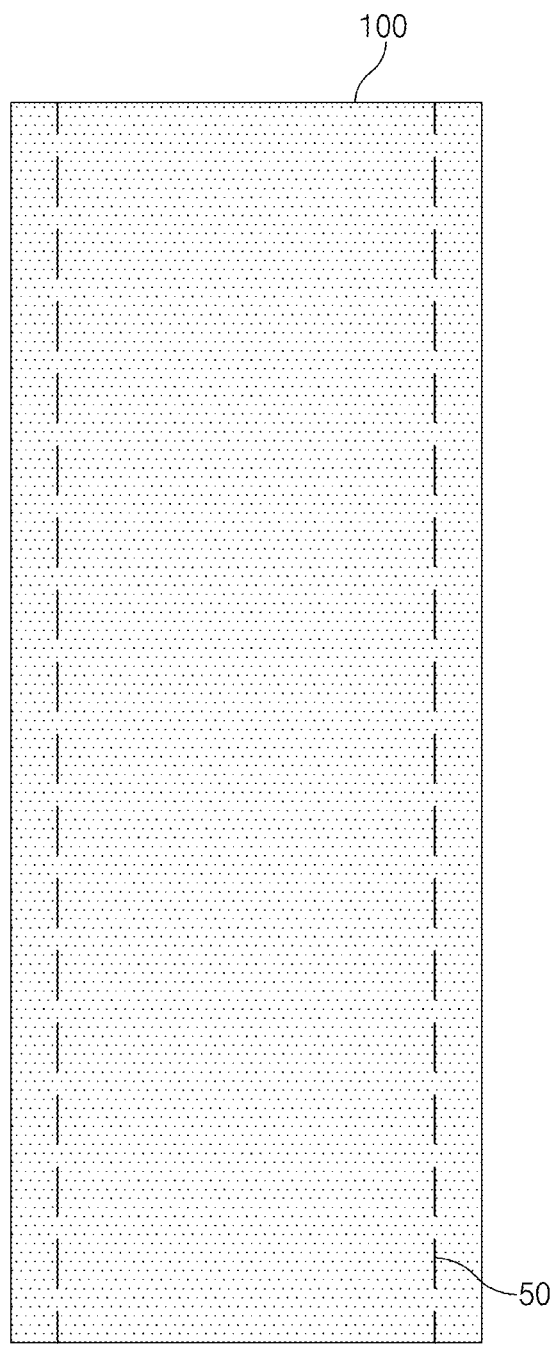

FIG. 5A and FIG. 5B are diagrams schematically illustrating a scheme of setting a region of interest in some forms of the present disclosure, and FIGS. 6 to 8 are diagrams illustrating a region of interest set in some forms of the present disclosure.

As shown in FIG. 5A, the controller 160 may perform active braking on a behavior of an object 21 spaced at a close distance apart from the vehicle 10 for the plurality of objects 20 traveling around the vehicle 10, and may perform passive braking on a behavior of an object 22 spaced at a relatively long distance. In some forms of the present disclosure, as shown in FIG. 5B, the controller 160 may calculate a critical distance δ for setting (changing) the region of interest based on a distance "d" of the object 20. The critical distance may be calculated based on a travel intention received from the object 20, a speed of the object 20, a yaw rate of the object 20, a steering wheel angle, a heading angle, a speed of the vehicle 10, an error of the sensor 110, and the state of the road being traveled.

For example, the controller 160 may set the region of interest corresponding to the object based on an integrated line 50. In some forms of the present disclosure, as shown in FIG. 6, the controller 160 may set a cut-in region 80 as a region of interest for determining whether the object is in the cut-in travel state.

In addition, in some forms of the present disclosure, as shown in FIG. 7, the controller 160 may set an inner path region 90 as the region of interest for determining whether the object is the inner path travel state. In some forms of the present disclosure, as shown in FIG. 8, the controller 160 may set a deflected region 100 as the region of interest for determining whether the object is in the deflected travel state.

The controller 160 may set the region of interest as in the description of FIGS. 5 to 8, and may change the region of interest based on the type of the object, a travel situation (the U-turn, the lane change, the deflected travel, and curved road travel), and the like of the vehicle. For a detailed description, FIGS. 9 to 11 will be referred.

FIGS. 9A to 10B are diagrams schematically illustrating a region of interest set in some forms of the present disclosure.

Figure 9A:
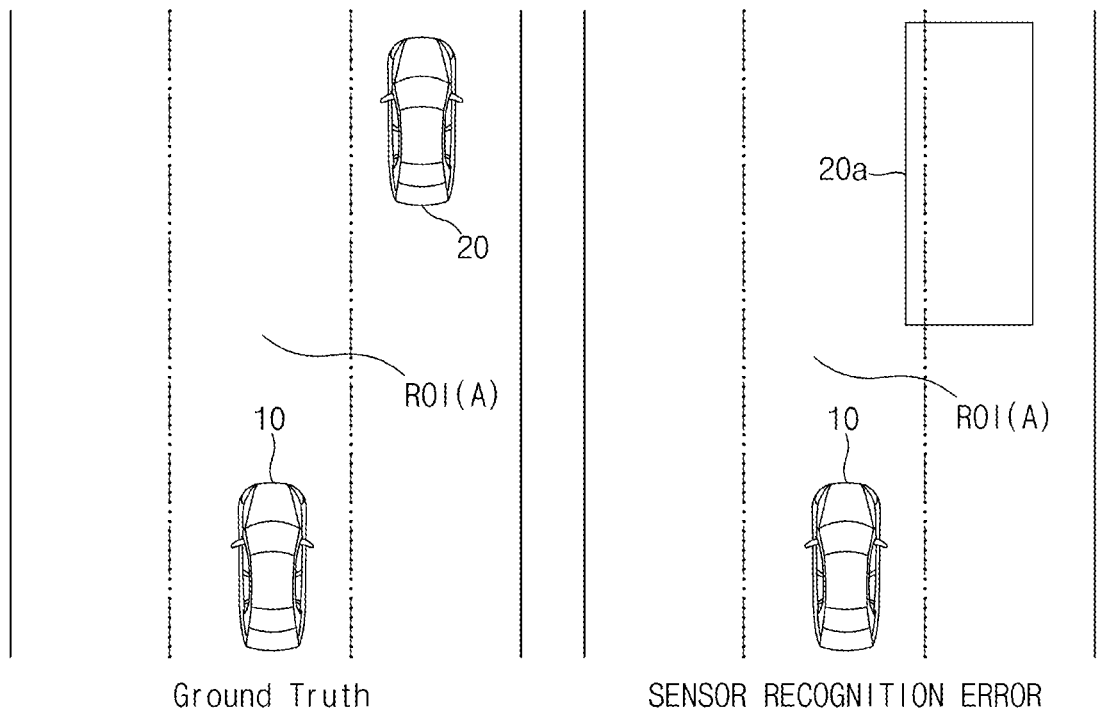
FIGS. 9A to 10B are diagrams schematically illustrating a region of interest set in one form of the present disclosure.
Figure 10A:
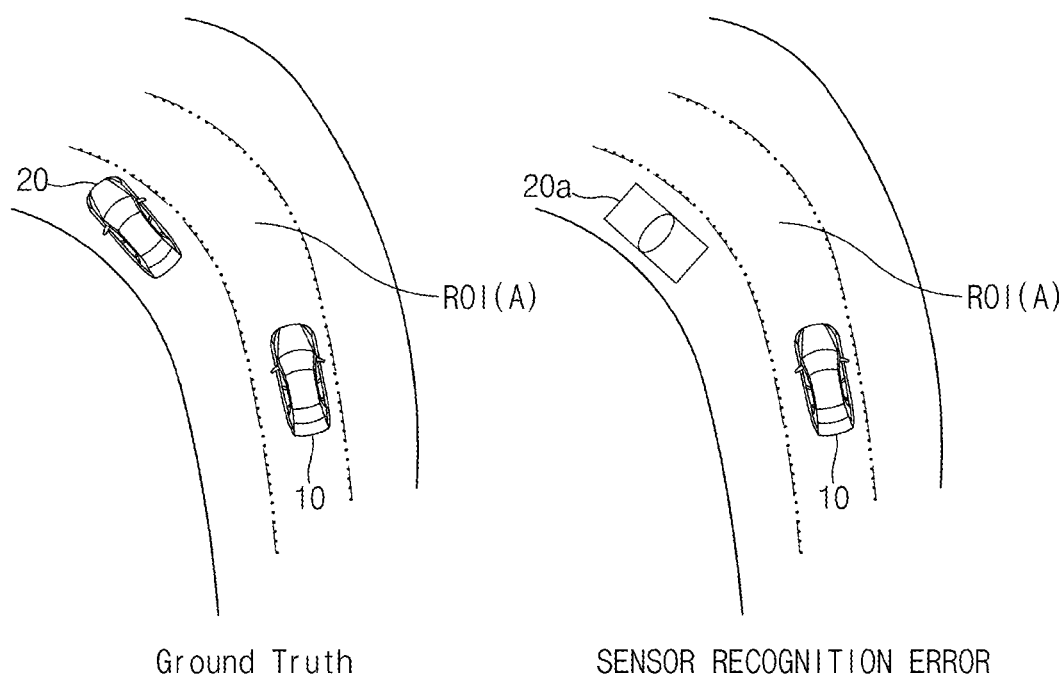

FIG. 9A and FIG. 10A are diagrams illustrating a case in which the object 20 enters a region of interest ROI(A). As shown in FIG. 9A and FIG. 10A, when the ground truth object 20 and an object 20a sensed by the error of the sensor are different, although the ground truth object 20 did not enter the region of interest ROI(A), but because of the error of the sensor of the vehicle 10, the sensed object 20a is determined to have entered the region of interest ROI(A). In this case, the vehicle 10 may perform the deceleration control, which is deceleration control resulted from misjudgement, so that ride comfort of the driver is lowered.

Figure 9B:
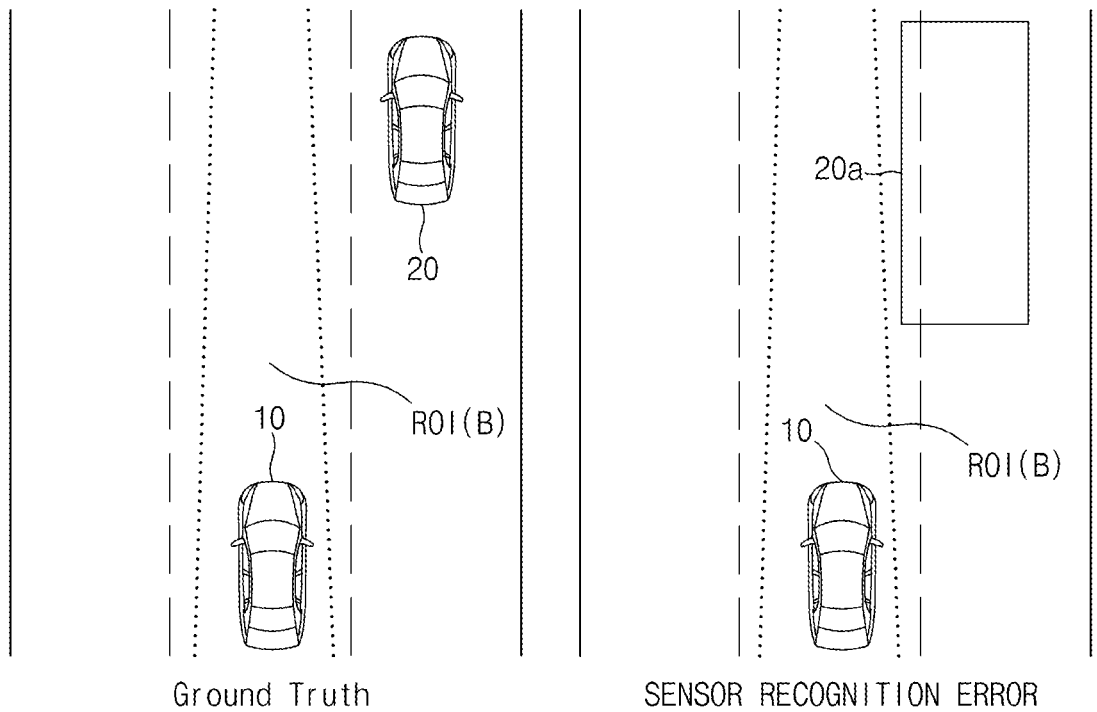
Figure 10B:
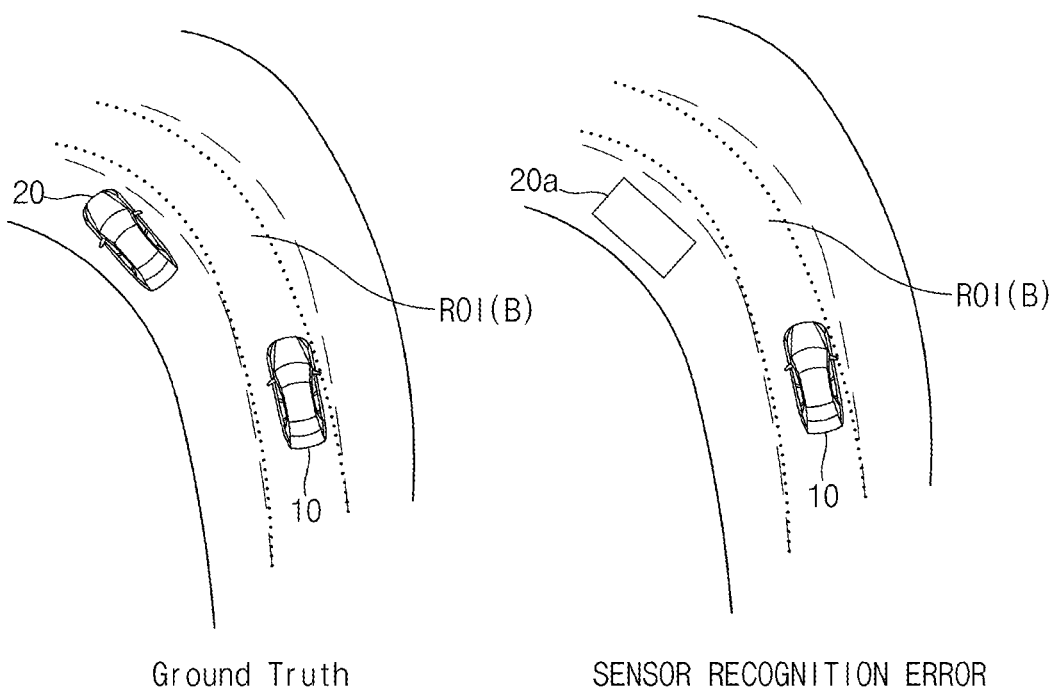

In one example, FIG. 9B and FIG. 10B are diagrams illustrating a case in which the object 20 enters the region of interest changed based on the travel information (straight travel or curved travel) of the vehicle in some forms of the present disclosure. As shown in FIG. 9B and FIG. 10B, even when a location of the ground truth object 20 and a location of the object 20a sensed by the error of the sensor are different, because the behavior is determined based on the location of the object 20a sensed based on a changed region of interest ROI(B), it may be determined that the sensed object 20a has not entered the region of interest ROI(B). In this case, the vehicle does not perform the deceleration control, which fundamentally blocks unnecessary deceleration control, thereby improving the ride comfort of the driver.

Figure 11A:
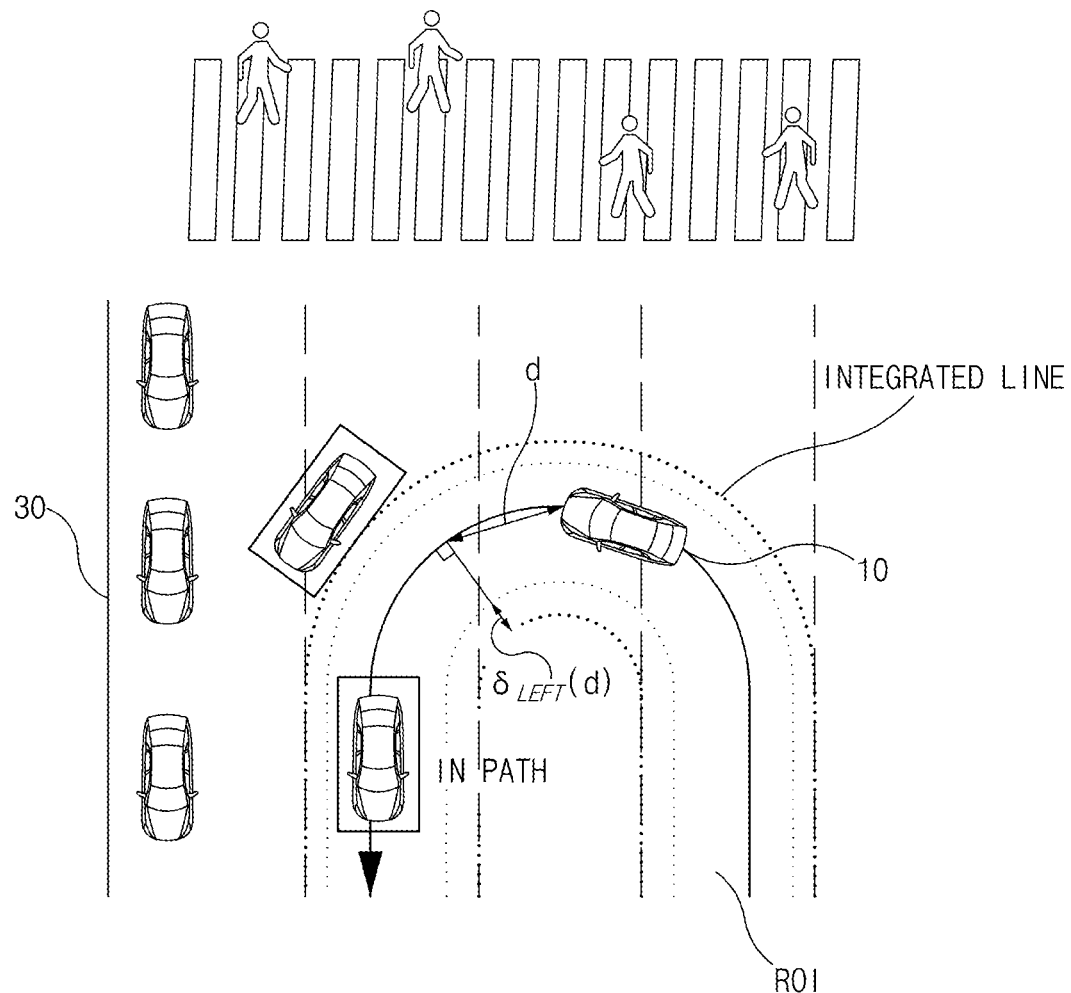
FIGS. 11A to 11C are diagrams schematically illustrating a region of interest changed based on travel information of the vehicle.
Figure 11B:
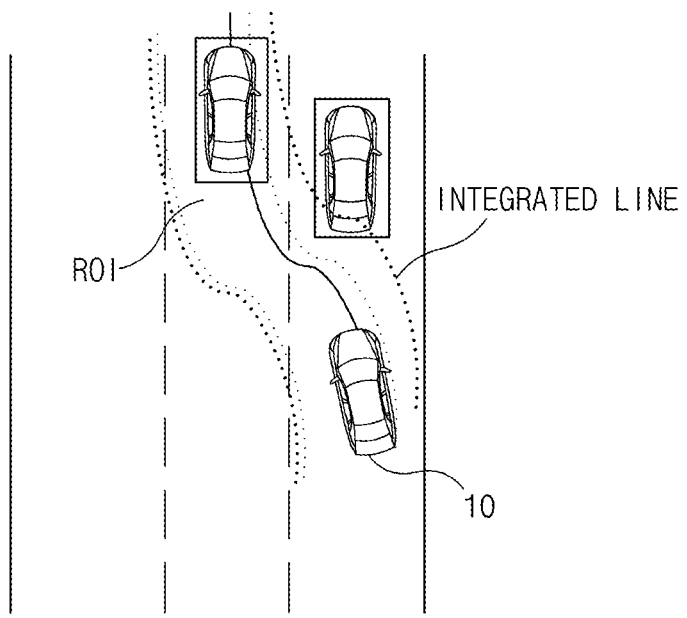
Figure 11C:
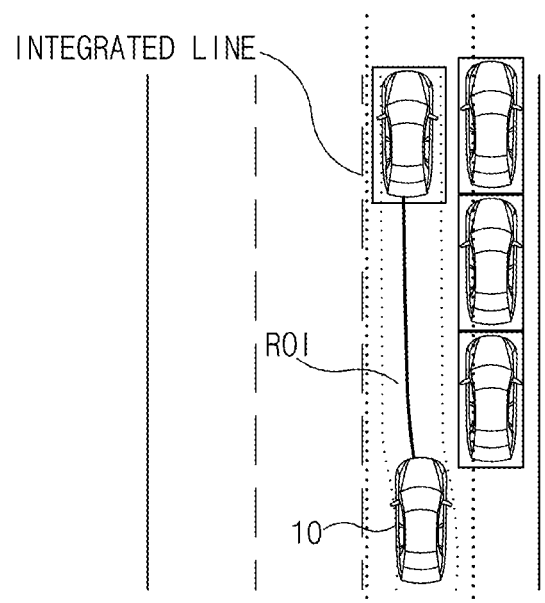

FIGS. 11A to 11C are diagrams schematically illustrating a region of interest changed based on travel information of the vehicle.

Specifically, FIG. 11A is a diagram illustrating a region of interest (ROI) changed based on the U-turn travel. When traveling on a curve, the vehicle 10 may set the region of interest (ROI) by reducing a width of the curve of the integrated line on an inner boundary side by the critical distance δ to prevent a collision with a vehicle traveling on an outer boundary side of the curve. In addition, FIG. 11B is a diagram illustrating a region of interest (ROI) changed based on the lane change. When changing the lane, the vehicle 10 may set the region of interest (ROI) by reducing a width of the integrated line by the critical distance (not shown). In addition, FIG. 11C is a view illustrating a changed region of interest (ROI) when the vehicle 10 performs the deflected travel to avoid a vehicle traveling on a right side of the vehicle. The region of interest (ROI) may be set by reducing the width of the integrated line by the critical distance (not shown).

In some forms of the present disclosure, the controller 160 may derive the critical distance in some forms of the present disclosure and change the region of interest based on the critical distance. For a more detailed description, FIGS. 12 and 13 will be referred.

Figure 12:
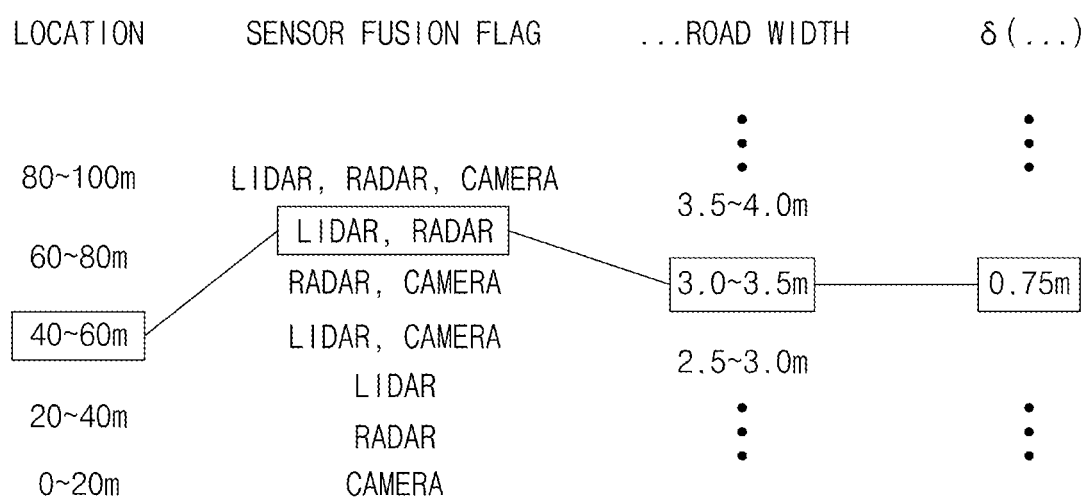
FIGS. 12 and 13 are diagrams schematically illustrating a scheme of calculating a critical distance for changing a region of interest in one form of the present disclosure.
Figure 13:
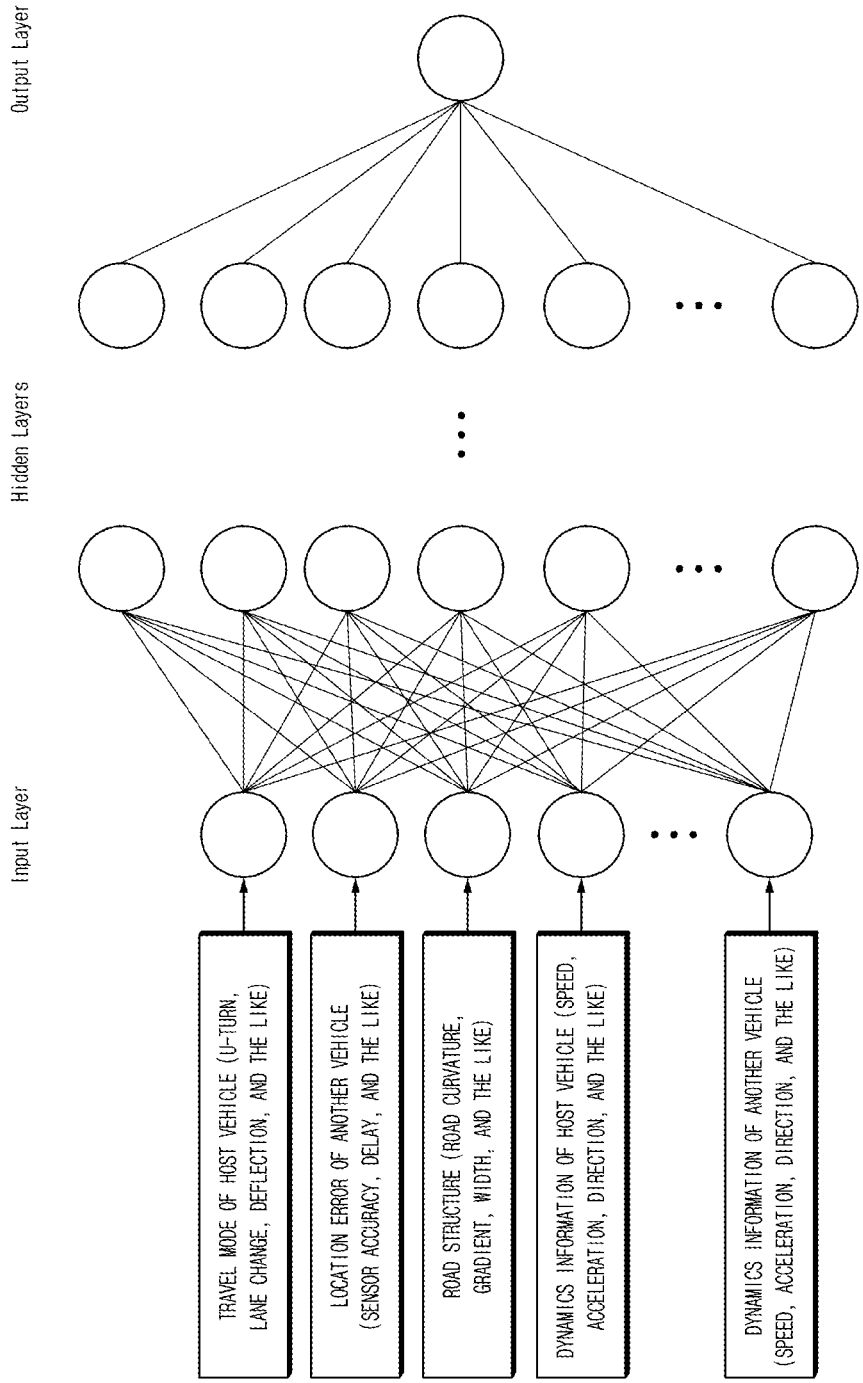

FIGS. 12 and 13 are diagrams schematically illustrating a scheme of calculating a critical distance for changing a region of interest in some forms of the present disclosure.

As shown in FIG. 12, the controller 160 may create the critical distance δ calculated based on the travel information of the vehicle and the information on the road as a look up table, and may change the region of interest based on the critical distance δ Included in the look up table. In some forms of the present disclosure, the controller 160 may calculate the critical distance based on a distance between the vehicle and the object around the vehicle, a fusion flag of the sensor that senses the object, and a width of the road on which the vehicle is traveling, generate the critical distance as the look up table, and store the look up table.

As shown in FIG. 13, the controller 160 may learn a data set including the travel information of the vehicle and the information on the road to output the critical distance δ, and change the region of interest based on the critical distance δ. In some forms of the present disclosure, the controller 160 may learn an actual travel data set of the driver of the vehicle to change the region of interest based on a response of the driver to a situation similar to an actual travel situation of the vehicle. The controller 160 may input a travel mode of the vehicle, a location error of the object (sensing accuracy of the vehicle and a delay), the information on the road (a road curvature and a gradient), the information on the dynamics (the speed, the acceleration, and the travel direction) of the vehicle, the information on the dynamics (the speed, the acceleration, and the travel direction) of the object, and the like to an input layer such that the actual travel data set is learned.

In some forms of the present disclosure, the controller 160 may create a neural network that outputs the critical distance by collecting a data set for each of the case in which the object is determined to be in the cut-in travel state, the case in which the object is determined to be in the inner path travel state, and the case in which the object is determined to be in the deflected travel state. In addition, the controller 160 may design a cost function such that the critical distance that may minimize a case in which a movement of the object is misjudged or not determined may be selected, and learn the data set to output a critical distance that minimizes the cost function.

In some forms of the present disclosure, when creating the neural network, the data set may be learned using a deep learning structure including one of a convolution neural network (CNN), a recurrent neural network (RNN), a deep belief network (DBN), a long short-term memory (LSTM), a generative adversarial network (GAN), and a soft max model. However, the present disclosure may not be limited thereto, and may also include a deep neural network structure capable of outputting the critical distance by learning the travel data set. In some forms of the present disclosure, the neural network structure of the present disclosure may include at least 10 hidden layers, and the number of all nodes may be at least 500.

In some forms of the present disclosure, a critical distance output from an output layer may include a margin distance from the integrated line, the region of interest may be increased when the critical distance is created outside the integrated line, and the region of interest may be decreased when the critical distance is created inside the integrated line.

When an error occurs in a region of interest set when determining the movement of the object in some forms of the present disclosure and a region of interest to be set when determining the movement of the ground truth object, the controller 160 may calculate a critical distance difference value Δδ and use the critical distance difference value Δδ as a feedback when learning the data set.

A learning method in some forms of the present disclosure may include a simulation-based deep learning, a deep learning using data sets acquired by the server from a plurality of vehicles, a deep learning using data sets acquired by an autonomous travel vehicle, and a process of applying the learning methods based on a direction of development. In some forms of the present disclosure, the controller 160 may generate a learning model by performing the simulation-based deep learning when an initial data set is insufficient. Thereafter, when the sufficient number of data sets are acquired, the deep learning using the data sets acquired by the server may be performed. Thereafter, a user may directly specify the region of interest such that a driving tendency of the user may be reflected, or set a weight and reflect the weight in the critical distance. In some forms of the present disclosure, the controller 160 may set the weight to be low as the user places importance on safe driving during the driving (complies with traffic laws, complies with a regulation speed, and the like), and may set the weight to be high as the user doesn't place importance on the safe driving.

The controller 160 may generate a calculation formula for calculating the critical distance based on the travel information of the vehicle, the travel information of the object, and the distance between the vehicle and the object, and change the region of interest based on the critical distance using the calculation formula. In some forms of the present disclosure, the controller 160 may express the generated calculation formula as Calculation Formula 1, and may design the Calculation Formula 1 to be nonlinear.

$$\delta_i(d, V_{ego}, V_{other}, \varepsilon_{ave}, d) = C_1 d + C_2 V_{ego} + C_3 V_{other} + C_4 \varepsilon_{ave} + \ldots \quad \text{<Calculation Formula>}$$

(Here, $V_{ego}$: the vehicle speed, $V_{other}$: a speed of an i-th object, d: a distance between the vehicle and the i-th object, $\varepsilon_{ave}$: an average sensor lateral error value of the i-th object (m), $C_i$: a constant)

The controller 160 may calculate the critical distance based on the travel information of the vehicle, generate a compensation function based on an average speed and the average number of sudden braking of the vehicle, adjust the critical distance based on the compensation function, and change the region of interest based on the adjusted critical distance. In some forms of the present disclosure, the controller 160 may design a compensation function that maximizes the average speed, minimizes the number of sudden braking, and maximizes a time to collision (TTC).

Because a plurality of regions of interest set in some forms of the present disclosure have an organic relationship, the controller 160 may allow a movement of the object in another region of interest to be determined even when the movement of the object is misjudged in a predetermined region of interest. For a more detailed description, FIGS. 14 and 15 will be referred.

Figure 14:
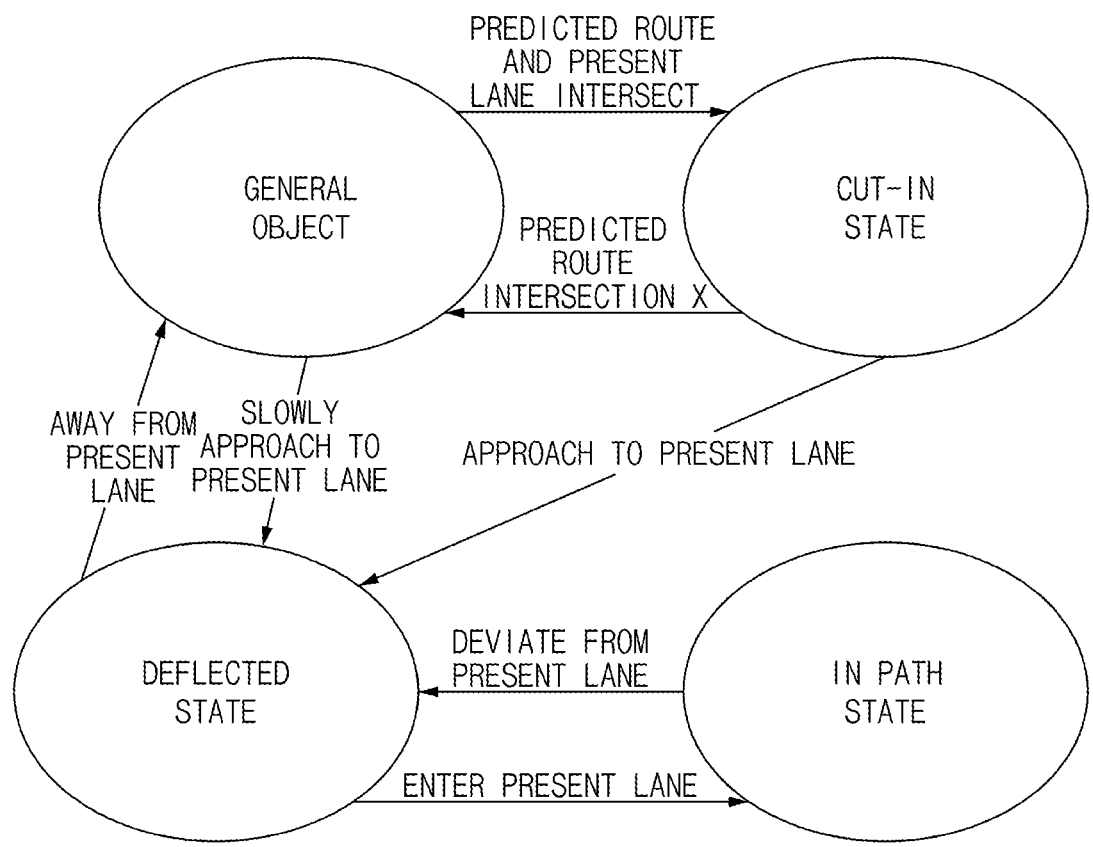
FIGS. 14 and 15 are diagrams schematically illustrating relationships of a region of interest set in one form of the present disclosure.
Figure 15:
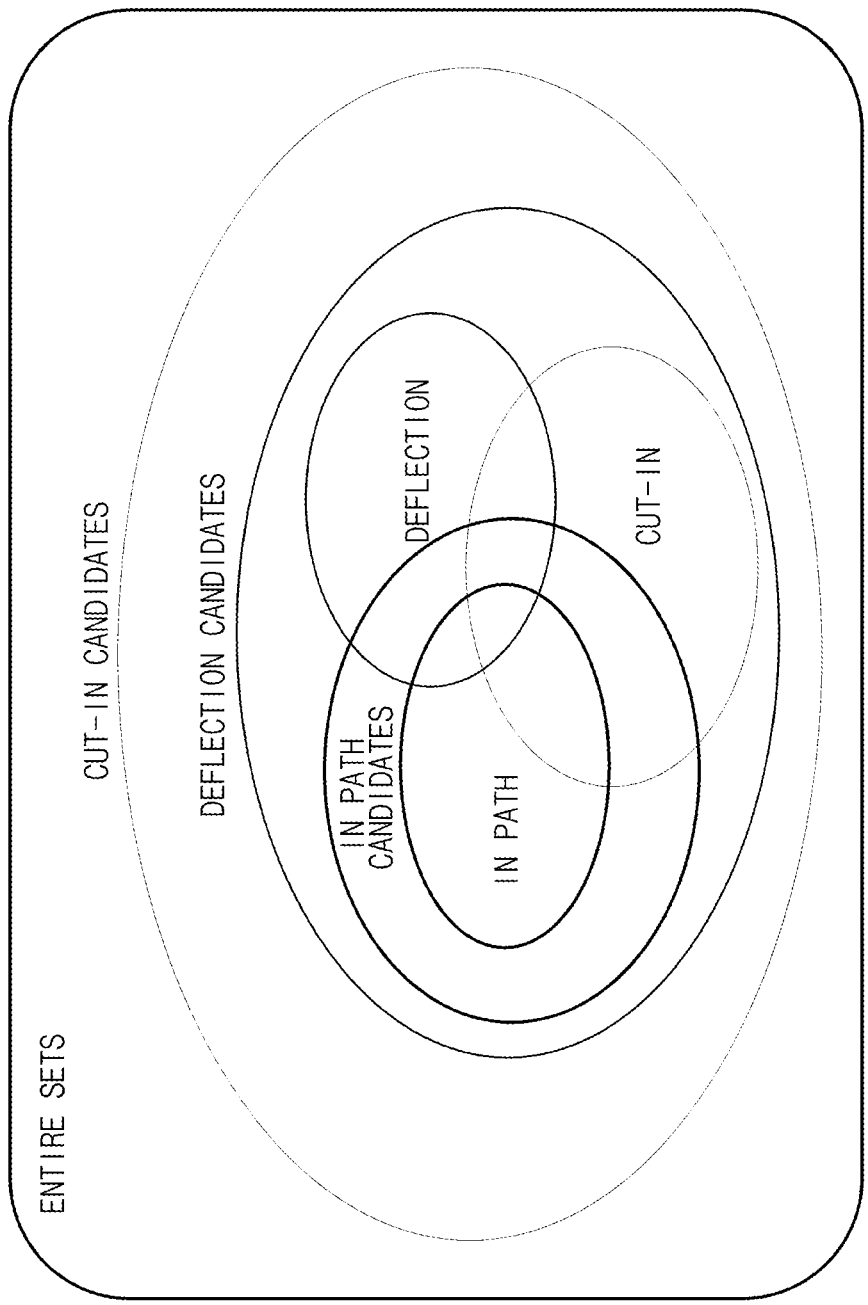

FIGS. 14 and 15 are diagrams schematically illustrating relationships of a region of interest set in some forms of the present disclosure.

As shown in FIGS. 14 and 15, because movements of the object in the inner path state and the deflected state are determined to be close, when objects determined to be in the inner path state are excluded from a specific frame, the controller 160 may determine that the objects excluded from the specific frame are in the deflected state. In addition, the controller 160 may determine that the object is in the deflected state, then determine that the object is in the cut-in state again, and then, determine that the object is in the inner path state again. Thereafter, when the object is excluded from the frame, the controller 150 may determine that the object is in the inner path state using FIGS. 14 and 15.

The controller 160 may determine the behavior of the object based on the region of interest set as described above or the region of interest changed based on the travel information of the vehicle. For a more detailed description, FIGS. 16 to 18 will be referred.

Figure 16:
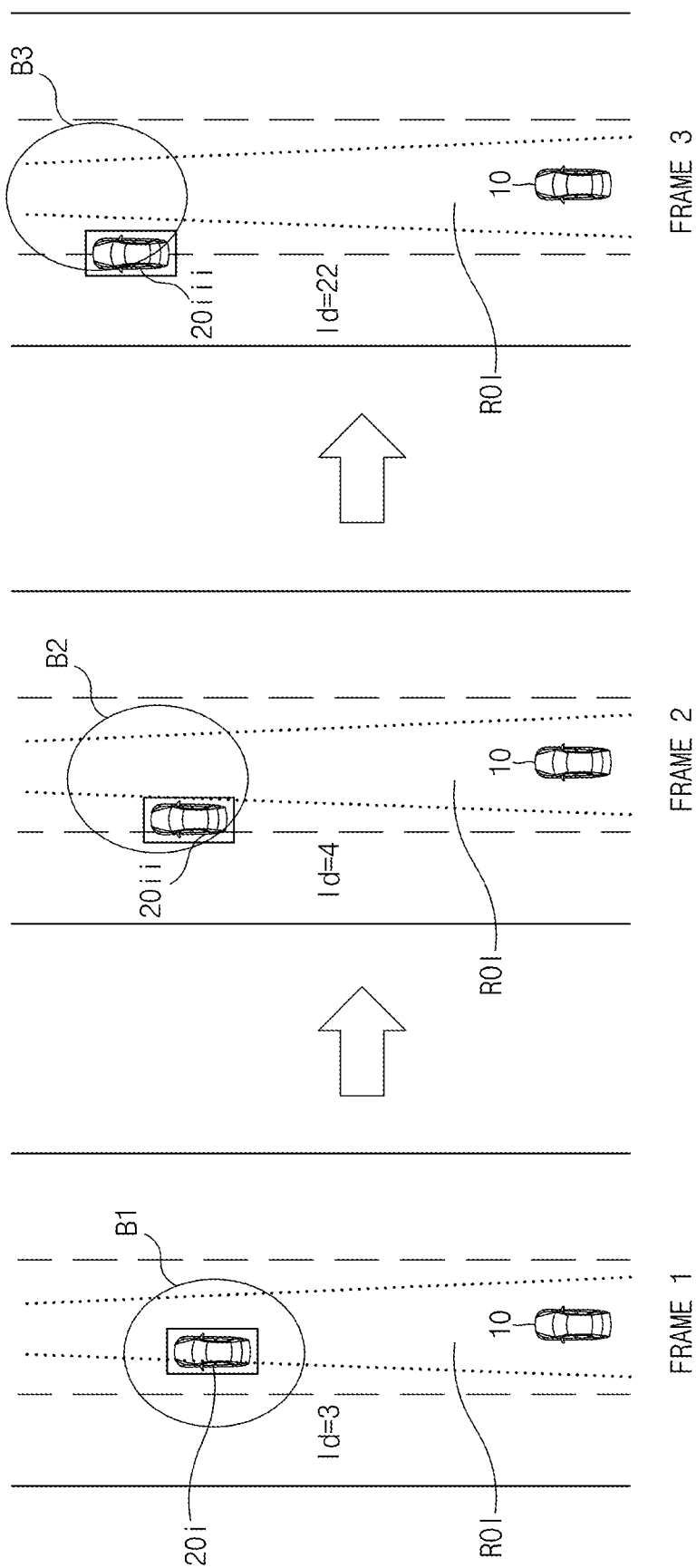
FIGS. 16 to 18 are diagrams schematically illustrating an operation of determining a behavior of an object based on a region of interest set in one form of the present disclosure.
Figure 17:
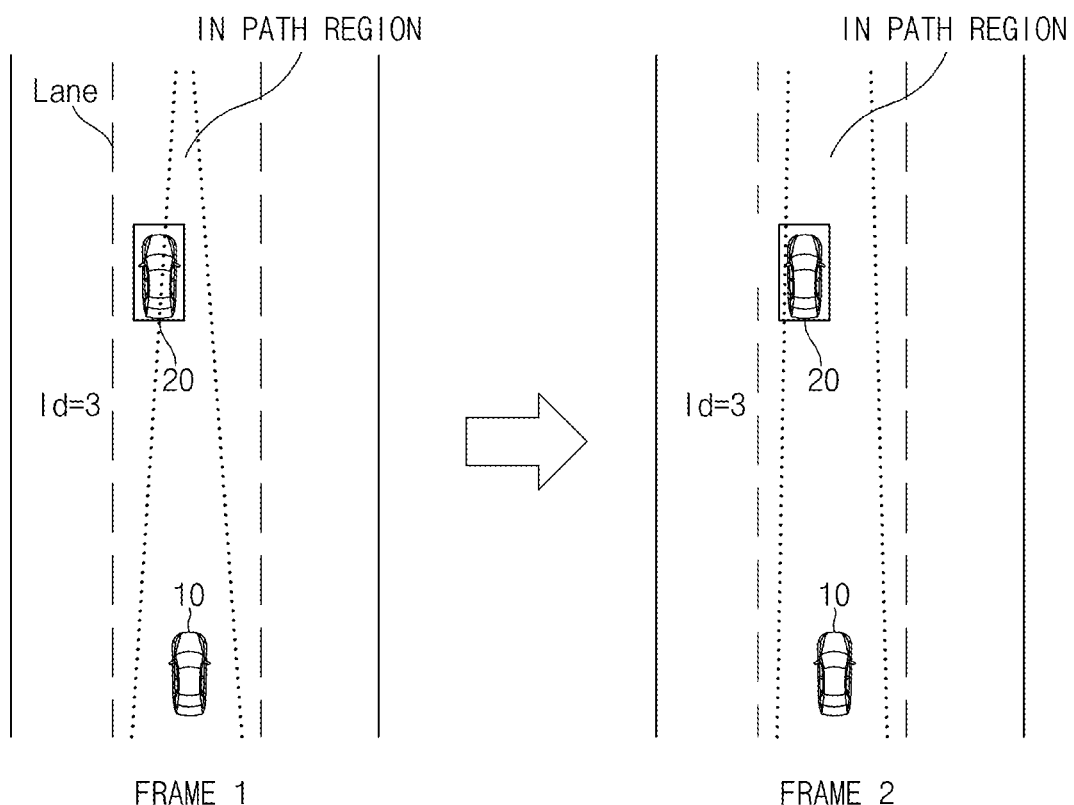
Figure 18:
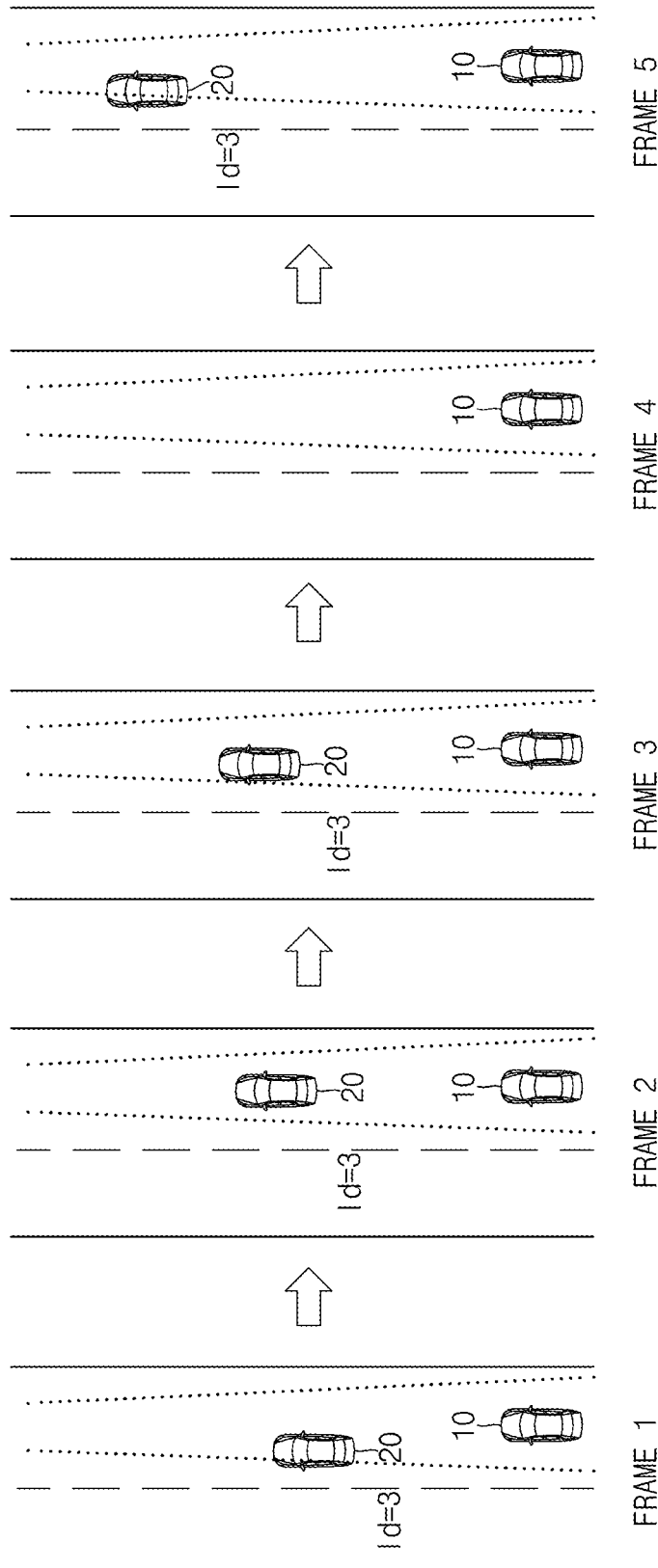

FIGS. 16 to 18 are diagrams schematically illustrating an operation of determining a behavior of an object based on a region of interest set in some forms of the present disclosure.

After the region of interest is set, or after the region of interest is changed based on the travel information of the vehicle, information on some or all of the objects may become different in frames because of phenomena such as non-measuring of the sensor, a tracking failure, splitting or merging of objects in a fusion step of the sensor, and the like. In this case, whether the objects sensed in the frames are the same object may be determined, and behaviors of the plurality of objects may be determined.

More specifically, as shown in FIG. 16, the controller 160 may set boundaries $B_1$, $B_2$, and $B_3$ using dead reckoning respectively for frames based on information on dynamics of an object 20*i* sensed by the sensor in a frame 1. When information ID of a plurality of objects 20*i*, 20*ii*, and 20*iii* sensed by the sensor in frames 1 to 3 are all different (e.g., when ID=3 in the frame 1, ID=4 in the frame 2, and ID=22 in the frame 3), the controller 160 may determine whether the plurality of objects are the same object based on the boundaries $B_1$, $B_2$, and $B_3$. When it is determined that the plurality of objects 20*i*, 20*ii*, and 20*iii* sensed in the different frames are the same object, the controller 160 may set the same region of interest (ROI) for the plurality of objects. In addition, the controller 160 may determine behaviors of the plurality of objects 20*i*, 20*ii*, and 20*iii* based on the same region of interest (ROI).

The controller 160 may set different regions of interest in a case in which the object enters the region of interest and a case in which the object deviates from the region of interest, and determine the behavior of the object based on the region of interest.

More specifically, as shown in FIG. 17, when an inner path region is generated as the region of interest in a frame 1, the controller 160 may determine that the inner path travel and the deflected travel are continuously transitioned with respect to the object 20 traveling by stepping on the line on which the vehicle 10 is traveling. That is, because the inner path region for determining the inner path travel of the object 20 is generated to be narrow, when the object 20 attempts to enter the inner path region, the travel of the object 20 is determined to be the inner path travel when a portion of the object 20 enters the inner path region. When the object 20 attempts to deviate from the inner path region, the travel of the object 20 is determined to be the deflected travel even when the portion of the object 20 deviates from the inner path region.

Therefore, in some forms of the present disclosure, the controller 160 may create a region of interest in a frame 2 to be greater than the region of interest generated in the frame 1 to allow the object 20 to be determined to be continuously performing the inner path travel. That is, when the object 20 attempts to enter the inner path region in the frame 1, the controller 160 may determine that the object 20 is in the inner path travel. In addition, because the inner path region is expanded in the frame 2, even when the object 20 attempts to deviate from the inner path region, the controller 160 may determine that the object 20 has not deviated from the inner path region, and the object 20 is in the inner path travel. As described above, in some forms of the present disclosure, when determining the travel state of the object, the controller 160 may have a hysteresis section to prevent the determination result from changing at any time at a boundary of the region of interest.

Even when the sensor does not sense the object in a predetermined frame, when the object is sensed in frames of the number higher than a predetermined number of frames, the controller 160 may determine the behavior of the object based on the region of interest.

More specifically, as shown in FIG. 18, when the object 20 sensed by the sensor in a frame 1, a frame 2, and a frame 3 is not sensed in a frame 4, and then is sensed again in a frame 5, the controller 160 may determine that a blind spot of the sensor is temporarily formed in the frame 4. Accordingly, when it is determined that the object has entered the region of interest (the inner path region) in the frame 1, the frame 2, the frame 3, and the frame 5, the controller 160 may determine that the object is in the inner path travel.

Figure 19:
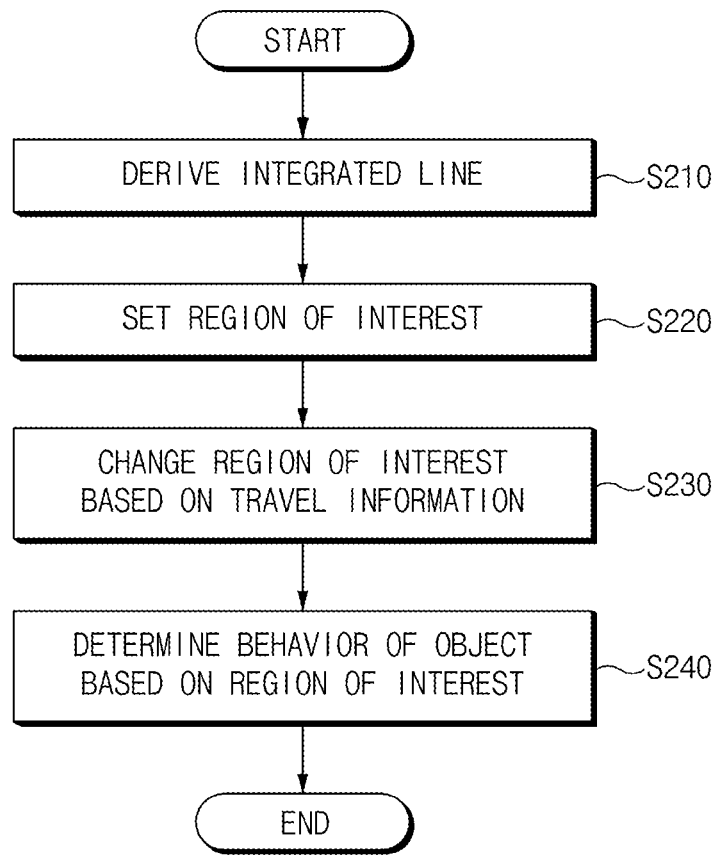
FIG. 19 is a flowchart illustrating a vehicle control method in one form of the present disclosure.

FIG. 19 is a flowchart illustrating a vehicle control method in some forms of the present disclosure.

As shown in FIG. 19, the controller 160 may create the integrated line corresponding to the road on which the vehicle is traveling (S210). For a more detailed description of S210, refer to the description of FIGS. 2 to 4.

The controller 160 may set the region of interest corresponding to the object sensed around the vehicle (S220). In this connection, the region of interest may include at least one of the cut-in region, the inner path region, and the deflected region for determining the behavior of an object.

The controller 160 may change the region of interest based on the travel information of the vehicle and the information on the road (S230). In some forms of the present disclosure, in S230, the controller 160 may calculate the critical distance based on the travel information of the vehicle and the information on the road, and change the region of interest based on the critical distance. The controller 160 may pre-calculate the critical distance based on the travel information of the vehicle and the road information and store the critical distance as the look up table. In addition, the controller 160 may learn the data set including the travel information of the vehicle and the road information, and then output the critical distance as the learning result. In addition, the controller 160 may generate the calculation formula for calculating the critical distance based on the travel information of the vehicle, the travel information of the object, and the distance between the vehicle and the object, and calculate the critical distance based on the calculation formula. In addition, the controller 160 may calculate the critical distance based on the travel information of the vehicle, generate the compensation function based on the average speed of the vehicle and the average number of sudden braking, and adjust the pre-calculated critical distance based on the compensation function.

The controller 160 may determine the behavior of the object based on the region of interest set in S220 or the region of interest changed in S230 (S240).

Figure 20:
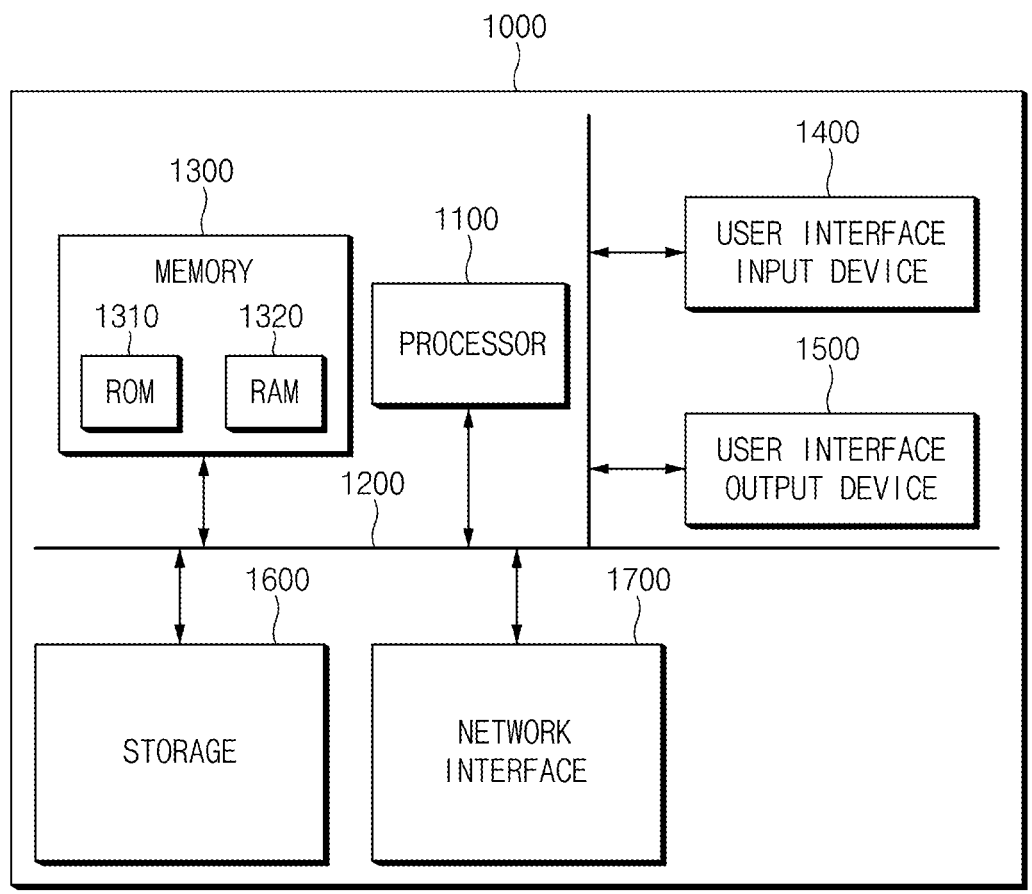
FIG. 20 is a diagram illustrating a configuration of a computing system executing a method in one form of the present disclosure.

FIG. 20 is a diagram illustrating a configuration of a computing system executing a method in some forms of the present disclosure.

Referring to FIG. 20, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, some forms of present disclosure are not intended to limit the technical idea of the present disclosure but to illustrate the present disclosure, and the scope of the technical idea of the present disclosure is not limited by some forms of the present disclosure. The scope of the present disclosure should be construed as being covered by the scope of the appended claims, and all technical ideas falling within the scope of the claims should be construed as being included in the scope of the present disclosure.

The device and the method for controlling the vehicle in some forms of the present disclosure may accurately determine the behavior of the object around the vehicle even when the error or the delay of the sensor occurs, so that unnecessary deceleration may be reduced, thereby improving the ride comfort of the driver.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a vehicle, the device comprising:
   a sensor configured to sense an object around the vehicle and acquire travel information of the vehicle; and
   a controller configured to:
   create integrated lines corresponding to a road where the vehicle is traveling; and
   set a region of interest corresponding to the object based on the integrated lines, and change the region of interest based on the travel information,
   wherein the controller changes the region of interest based on a travel situation, and determines behavior of the object based on a location of the object sensed based on the changed region of interest,
   wherein the controller controls the vehicle based on the determined behavior of the object,
   wherein the controller creates the integrated lines based on at least one of lane link, lane side, point level path, or any combination thereof of the road, and
   wherein the integrated lines are created based on a road shape sensed by the sensor.

2. The device of claim 1, wherein the region of interest includes at least one of a cut-in region, an inner path region, or a deflected region.

3. The device of claim 1, wherein the controller is configured to:
   store a critical distance calculated based on the travel information and information on the road as a look up table; and
   change the region of interest based on the critical distance.

4. The device of claim 1, wherein the controller is configured to:
   learn a data set including the travel information and information on the road to output a critical distance; and
   change the region of interest based on the critical distance.

5. The device of claim 1, wherein the controller is configured to:
   generate a calculation formula for calculating a critical distance based on the travel information, travel information of the object, and a distance between the vehicle and the object; and
   change the region of interest based on the critical distance calculated based on the calculation formula.

6. The device of claim 1, wherein the controller is configured to:
   calculate a critical distance based on the travel information;
   generate a compensation function based on an average speed and an average number of sudden braking of the vehicle;
   adjust the critical distance based on the compensation function; and
   change the region of interest based on the adjusted critical distance.

7. The device of claim 1, wherein the controller is configured to:
   determine the behavior of the object based on the region of interest.

8. The device of claim 7, wherein the controller is configured to:
   apply the region of interest equally to a plurality of objects;
   determine whether the plurality of objects is identical to each other using dead reckoning after the region of interest is set; and
   determine behaviors of the plurality of objects when the plurality of objects is determined to be identical to each other.

9. The device of claim 7, wherein the controller is configured to:
   set a first region of interest when the object enters the region of interest;
   set a second region of interest that is different from the first region of interest when the object deviates from the region of interest; and
   determine the behavior of the object based on the first region of interest and the second region of interest.

10. The device of claim 7, wherein:
    the sensor is configured to sense the object in a number of frames greater than a predetermined number, and
    the controller is configured to determine the behavior of the object based on the region of interest when the object is sensed in the number of frames greater than the predetermined number.

11. A method for controlling a vehicle, the method comprising:
    sensing, by a sensor, an object around the vehicle and acquiring travel information of the vehicle;
    creating, by a controller, integrated lines corresponding to a road where the vehicle is traveling; and
    setting, by the controller, a region of interest corresponding to the object based on the integrated lines, and changing the region of interest based on the travel information,
    wherein the controller changes the region of interest based on a travel situation, and determines behavior of the object based on location of the object sensed based on the changed region of interest,
    wherein the controller controls the vehicle based on the determined behavior of the object,
    wherein the controller creates the integrated lines based on at least one of lane link, lane side, point level path, or any combination thereof of the road, and
    wherein the integrated lines are created based on a road shape sensed by the sensor.

12. The method of claim 11, wherein the region of interest includes at least one of a cut-in region, an inner path region, or a deflected region.

13. The method of claim 11, further comprising:
    storing, by the controller, a critical distance calculated based on the travel information and information on the road as a look up table; and
    changing, by the controller, the region of interest based on the critical distance.

14. The method of claim 11, further comprising:
    learning, by the controller, a data set including the travel information and information on the road to output a critical distance; and
    changing, by the controller, the region of interest based on the critical distance.

15. The method of claim 11, further comprising:
    generating, by the controller, a calculation formula for calculating a critical distance based on the travel information, travel information of the object, and a distance between the vehicle and the object; and
    changing, by the controller, the region of interest based on the critical distance calculated based on the calculation formula.

16. The method of claim 11, further comprising:
calculating, by the controller, a critical distance based on the travel information;
generating, by the controller, a compensation function based on an average speed and an average number of sudden braking of the vehicle;
adjusting, by the controller, the critical distance based on the compensation function; and
changing, by the controller, the region of interest based on the adjusted critical distance.

17. The method of claim 11, further comprising:
determining, by the controller, the behavior of the object based on the region of interest.

18. The method of claim 17, further comprising:
applying, by the controller, the region of interest equally to a plurality of objects;
determining, by the controller, whether the plurality of objects is identical to each other using dead reckoning after the region of interest is set; and
determining, by the controller, behaviors of the plurality of objects when the plurality of objects is determined to be identical to each other.

19. The method of claim 17, further comprising:
setting, by the controller, a first region of interest when the object enters the region of interest;
setting, by the controller, a second region of interest that is different from the first region of interest when the object deviates from the region of interest; and
determining, by the controller, the behavior of the object based on the first region of interest and the second region of interest.

20. The method of claim 17, further comprising:
sensing, by the sensor, the object in a number of frames greater than a predetermined number; and
determining, by the controller, the behavior of the object based on the region of interest when the object is sensed in the number of frames greater than the predetermined number.

* * * * *